(12) United States Patent
Maruyama et al.

(10) Patent No.: US 6,587,629 B1
(45) Date of Patent: Jul. 1, 2003

(54) OPTICAL WAVEGUIDE CHANNEL DEVICE

(75) Inventors: Shinji Maruyama, Itami (JP); Naoki Nishida, Kusatsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/576,317

(22) Filed: May 22, 2000

(30) Foreign Application Priority Data

May 24, 1999 (JP) .......................................... 11-142611

(51) Int. Cl.$^7$ ................................................ G02B 6/10
(52) U.S. Cl. ........................ 385/132; 385/129; 385/130; 385/131
(58) Field of Search .............................. 385/28, 42, 43, 385/50, 130, 132, 32, 126, 115, 116, 121, 14

(56) References Cited

U.S. PATENT DOCUMENTS

| | | | | |
|---|---|---|---|---|
| 5,142,596 A | * | 8/1992 | Mizuuchi | 385/43 |
| 5,394,492 A | * | 2/1995 | Hwang | 385/33 |
| 5,559,913 A | * | 9/1996 | Lerminiaux | 385/43 |
| 5,719,976 A | | 2/1998 | Henry et al. | 385/50 |
| 5,949,931 A | * | 9/1999 | Kitamura | 385/28 |
| 6,112,002 A | * | 8/2000 | Tabuchi | 385/50 |

* cited by examiner

*Primary Examiner*—Brian Healy
*Assistant Examiner*—Kevin S Wood
(74) *Attorney, Agent, or Firm*—Burns, Doane, Swecker & Mathis, LLP (57) ABSTRACT

In an optical waveguide channel device equipped with multiple cores, the distances between cores at the entry edge must be large in order to cause a laser beam to enter each core. On the other hand, the distances at the exit edge must be small. Therefore, the core must have a curved area at which the axis is curved. Further, in order to make it easier to match the spot of the entering beam and the core, the core diameter of the optical waveguide channel device and the beam spot diameter of the entering light are made large. However, in a core having a multi-mode curved area, high-order light is easily excited at the curved area. Therefore, the curved area from the entry edge to the exit edge of each core is made to have a single mode. Consequently, exit light having an essentially Gaussian profile may be obtained.

17 Claims, 7 Drawing Sheets

OPTICAL WAVEGUIDE CHANNEL DEVICE

The present application claims priority to Japanese Patent Application No. 11-142611 filed May 24, 1999, the content of which is hereby incorporated by reference.

BACKGROUND OF THE INVENTION

1. Field of the Invention

The present invention pertains to an optical waveguide channel device, and more particularly, to a multi-beam light source that is suitable for use as a light source in a laser printer.

2. Description of the Related Art

In recent years, as the information network has become increasingly advanced and digital, faster laser printers have come into strong demand. One means to speed up a laser printer involves acceleration of the rotation of the polygon mirror used for scanning. However, when the rate of rotation of the polygon mirror approaches 50,000 rpm, distortion is caused in the polygon surfaces due to the centrifugal force, and therefore it is difficult to increase the rate of rotation of the polygon mirror beyond the current level. Consequently, in order to further increase the image draw speed of a laser printer, scanning of the photoreceptor surface using multiple laser beams has conventionally been used.

Specifically, as disclosed in Japanese Laid-Open Patent Application Hei 10-282441, U.S. Pat. No. 4,637,679, U.S. Pat. No. 4,547,038 and U.S. Pat. No. 4,958,893, constructions have been proposed or adopted in which multiple laser beams are adjusted to have appropriate intervals between them by employing reflection by a polarized light beam splitter, half-mirror and/or prism surfaces to optically deflect the multiple laser beams. However, these methods have the shortcoming that if the number of the laser beams is large, it is difficult to appropriately align them, leading to large components and excessive cost. As a result, it is very difficult to speed up a laser printer beyond the current level using these methods.

Against this backdrop, a method in which a so-called multi-beam light source comprising multiple laser beams aligned according to a minute pitch is desired. As a specific realization of this method, three methods have been proposed, as disclosed in Japanese Laid-Open Patent Application Sho 54-7328: a method in which a so-called array laser comprising multiple laser diodes on a substrate is used as a multi-beam light source; a method in which the light emitted from optical fibers is used as a secondary light source; and a method in which an optical waveguide channel device equipped with multiple cores whose pitch at the light exit edge is smaller than that at the light entry edge.

In the method using an array laser, considering the state of image formation on the photoreceptor surface, it is preferred that the alignment pitch of the laser diodes be very small at 100 μm or less, so that the multiple laser beam spots are sufficiently close to one another. However, forming laser diodes on a substrate using such a minute pitch entails the problem of heat generation, and is therefore difficult. Therefore, the other methods involving the use of optical fibers or an optical waveguide channel device would appear to be more effective. Among those, the type that uses an optical waveguide channel device has the characteristic that it offers a high level of freedom in making the multiple optical channels small. In this patent application, an optical waveguide channel device refers to a flat waveguide channel device formed on a substrate.

Where a multi-beam light source is constructed using an optical waveguide channel device, it is difficult to cause multiple laser beams to enter the device at the entry edge while close to each other, and therefore, multiple laser beams are caused to strike the entry edge with certain intervals in between. These multiple laser beams need to be closer together at the exit edge. In other words, the distances between the axes of the multiple cores in which the laser beams pass in the optical waveguide channel device must be smaller at the exit edge than at the entry edge. In order to achieve this, the cores conventionally have had curved areas in which the axes are curved.

Figure 1:
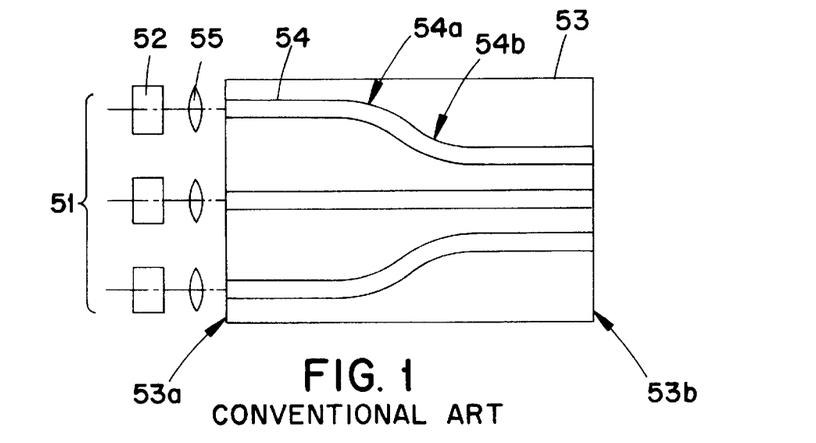
FIG. 1 is a cross-sectional view showing the construction of the multi-beam light source using the conventional technology.

FIG. 1 is a cross-section of one example of a conventional multi-beam light source. In the light source 51, multiple semiconductor laser devices 52 are used. Cores 54 of the optical waveguide channel device 53 are connected to the semiconductor laser devices 52 via lenses 55. As shown in FIG. 1, in the optical waveguide channel device 53, each core 54 is curved at multiple points (54a, 54b) in order to make the distances between the cores 54 smaller at the exit edge 53b than at the entry edge 53a.

It is generally known that, where laser beams are input and connect with the optical waveguide channel device from the entry edge, in order to increase the connecting efficiency, laser beams having a beam profile similar to the beam profile of the core's waveguide mode should be made to enter the device such that their optical axes match each other. However, the core diameter in an optical waveguide channel device generally small, and where it has a single waveguide mode, the core diameter could be as small as several micrometers. Therefore, in order to increase the connecting efficiency, the beam spots having a diameter of only several micrometers must be caused to enter the device, which makes it difficult to match the optical axes of the beam and the core. Further, if the optical axes do not match even by a small degree, the connecting efficiency is markedly reduced. If a discrepancy occurs between the optical axes due to diminished accuracy in position adjustment or aging of the device, the quality and power of the exit light is reduced to the degree that it pauses a practical problem.

Therefore, the core diameter in the optical waveguide channel device and the beam spot diameter of the incident light are increased. This not only makes positional adjustment easier but also reduces the rate of reduction of the connecting efficiency due to non-matching optical axes, increasing the tolerance for any discrepancy between the optical axes. The waveguide mode for a large diameter core is generally multi-mode.

However, in a multi-mode core that has a curved area, high-order light is easily excited in the curved area. Consequently, even if basic mode light is caused to enter the device, it is difficult to obtain exit light having a Gaussian profile. If the radius of curvature of the curved area were increased, excitation of high-order mode light that occurs in the curved area might be reduced, but the device would be large in size.

SUMMARY OF THE INVENTION

The object of the present invention is to provide an optical waveguide channel device having a construction in which the distances between the cores are smaller at the exit edge than at the entry edge, and in which the tolerance of any optical axis discrepancy when the laser beam and the core are connected may be increased and the light loss amount is small.

Another object of the present invention is to provide an optical waveguide channel device comprising a multi-beam light source from which exit light having an essentially Gaussian profile may be obtained.

These and other objects may be attained by an optical waveguide channel device, comprising a substrate; and multiple cores that are formed on the substrate and guide coherent beams, the distances between the axes of adjacent cores being smaller at the exit edge than at the entry edge, wherein a single mode is present in a specific area from the entry edge of each core to the exit edge, and the area of the cross-section perpendicular to the axis of the core is larger at the entry edge than at the specific area.

In the optical waveguide channel device having the construction described above, the area of each core at the entry edge is increased, and therefore, it is easy to allow the coherent beam to enter the core within the range of optical axis discrepancy tolerance. In addition, it is likely that the optical axis discrepancy that occurs due to aging will remain within the tolerance range. Further, by designating the area of each core at which high-order mode light is easily excited as the specific area and having the waveguide mode in that area be single mode, a construction in which high-order mode light is not easily excited may be obtained. Therefore, exit light having an essentially Gaussian beam profile with a small light loss may be obtained.

By having a curved area in each core, it becomes possible to easily construct an optical waveguide channel device in which the distances between the axes of the cores are smaller at the exit edge than at the entry edge. However, because high-order mode light is easily excited in the curved area of the core, by having the waveguide mode in this area be single mode, the excitation of high-order mode light is reduced.

It is also preferred that the area of the cross-section perpendicular to the axis of each core be different at the exit edge and within the curved area. Generally, the beam spot diameter and the expansion angle of the exit light vary depending on the cross-sectional area of the core at the exit edge. Therefore, by having the cross-sectional area of the core match the required exit light, any desired exit light may be obtained. On the other hand, because transmission in the curved area takes place in a single mode, the profile of the exit light is essentially Gaussian.

It is also preferred that the core has a prescribed area having a straight axis and a consistent configuration and an area in the cross-section perpendicular to the axis immediately before or after the curved area. Where the axis of the core is curved, when light travels, the profile becomes asymmetrical. Therefore, by creating immediately after the curved area a straight area in which force exhibiting this asymmetry does not operate, the asymmetry in the force received in the curved area is reduced. Alternatively, by having a straight area immediately before the curved area, the traveling light that is not receiving any asymmetrical force enters the curved area, so that high-order light does not easily result in this area.

The invention itself, together with further objects and attendant advantages, will best be understood by reference to the following detailed description taken in conjunction with the accompanying drawings.

BRIEF DESCRIPTION OF THE DRAWINGS

FIGS. 10(*a*) through 10(*g*) are simplified drawings showing a specific manufacturing process for the optical waveguide channel device.

In the following description, like parts are designated by like reference numbers throughout the several drawings.

DETAILED DESCRIPTION OF THE PREFERRED EMBODIMENT

Figure 2:
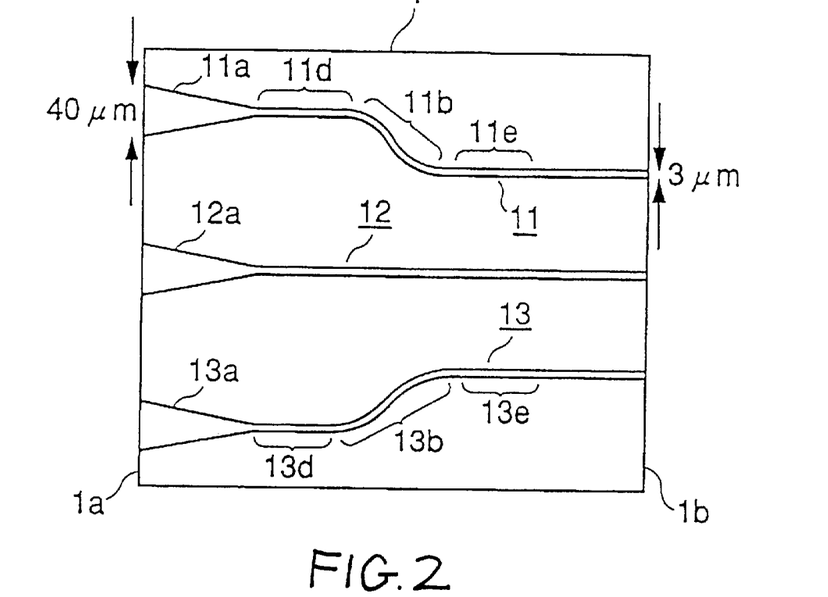
FIG. 2 is a vertical cross-sectional view of the optical waveguide channel device of this embodiment.

The embodiment of the present invention is explained below with reference to the drawings. FIG. 2 is a simplified cross-sectional view showing the construction of the optical waveguide channel device comprising a first embodiment of the present invention. In FIG. 2, 1 is an optical waveguide channel device having three cores 11, 12 and 13. FIG. 2 is a cross-sectional view including the axes of the cores 11, 12 and 13. The cross-section parallel to the cross-section that includes the core axes will be termed the 'transverse cross-section' below. The cores 11, 12 and 13 have tapered entry areas 11*a*, 12*a* and 13*a*, respectively, that expand toward the entry edge la of the optical waveguide channel device 1 when seen in a transverse cross-sectional view. The cross section perpendicular to the axis in parts other than the entry area 11*a*, 12*a* or 13*a* (hereinafter called the 'vertical cross-section') is constant in size and configuration, and a single mode is present as the waveguide mode. The cores 11 and 13 have curved areas 11*b* and 13*b*, respectively, where the axes are curved, such that the distances from the axis of the core 12 are smaller at the exit edge 1*b* than at the entry edge 1*a*.

In the optical waveguide channel device 1, when laser beams enter the cores 11, 12 and 13 from the entry edge 1*a*, the laser beams exit from the exit edge 1*b* with closer distances between them, forming secondary light sources. Because the waveguide mode of the curved areas 11*b* and 13*b*, where high-order light can be easily excited, is a single mode, high-order light is not easily excited. Where laser beams having an essentially Gaussian profile are caused to enter the cores, exit light having an essentially Gaussian configuration may be obtained. In addition, since the openings of the cores 11, 12 and 13 at the entry edge 1*a* are large, they offer a large tolerance range regarding any discrepancy in the axis of the entering beam.

Figure 3:
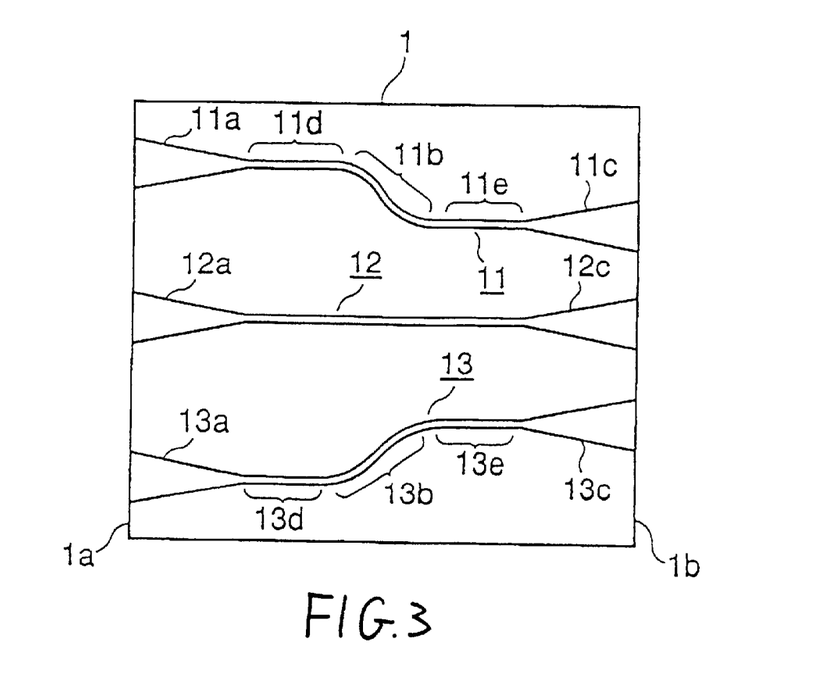
FIG. 3 is a vertical cross-sectional view of the optical waveguide channel device of this embodiment that has a different core configuration from that in FIG. 2.

In the optical waveguide channel device 1, the beam spot diameter and expansion angle of the exit light that may be obtained vary depending on the vertical cross-sectional area and configuration of the core 11, 12 or 13 at the exit edge 1b. Therefore, the cores 11, 12 and 13 are not limited to the example shown in FIG. 2, but may be configured such that they have a vertical cross-sectional area and configuration corresponding to the required exit light at the exit edge 1b. In other words, the exit area of each core should be configured such that the desired vertical cross-sectional area and configuration may be obtained. For example, as shown in FIG. 3, the core 11, 12 or 13 may have an exit area 11c, 12c or 13c, which is tapered in the transverse cross-sectional view such that it expands toward the exit edge 1b of the optical waveguide channel device 1, or conversely, the exit area 11c, 12c or 13c may be tapered such that it is smaller toward the exit edge 1b.

Where it is desired that the exit light beam expand not in the directions along the line of intersection between a vertical cross-section and a transverse cross-section, but in the directions perpendicular to the line of intersection, the core at the exit edge should have a rectangular vertical-cross section where it is large along the line of intersection and vertically small. Where another waveguide channel device is connected to the rear of the secondary light sources, in order to improve the connecting efficiency, the profile of the rear waveguide light must match the profile of the secondary light sources. Therefore, the cores should have a vertical cross-section that would provide the desired secondary light source profile.

With regard to both the entry edge and the exit edge, if the vertical cross-section in the core 11, 12 or 13 changes drastically, the areas of change are subject to such problems as excitation of high-order light. Therefore, the core should have a construction in which the target vertical cross-sectional area may be obtained through tapering, such that the vertical cross-section gradually changes. It is preferred that the change be gradual, with a tapering angle of 0.05 degrees or less. If the tapering angle is over 0.05 degrees, power loss rapidly increases, which will be explained below.

Figures 4, 5:
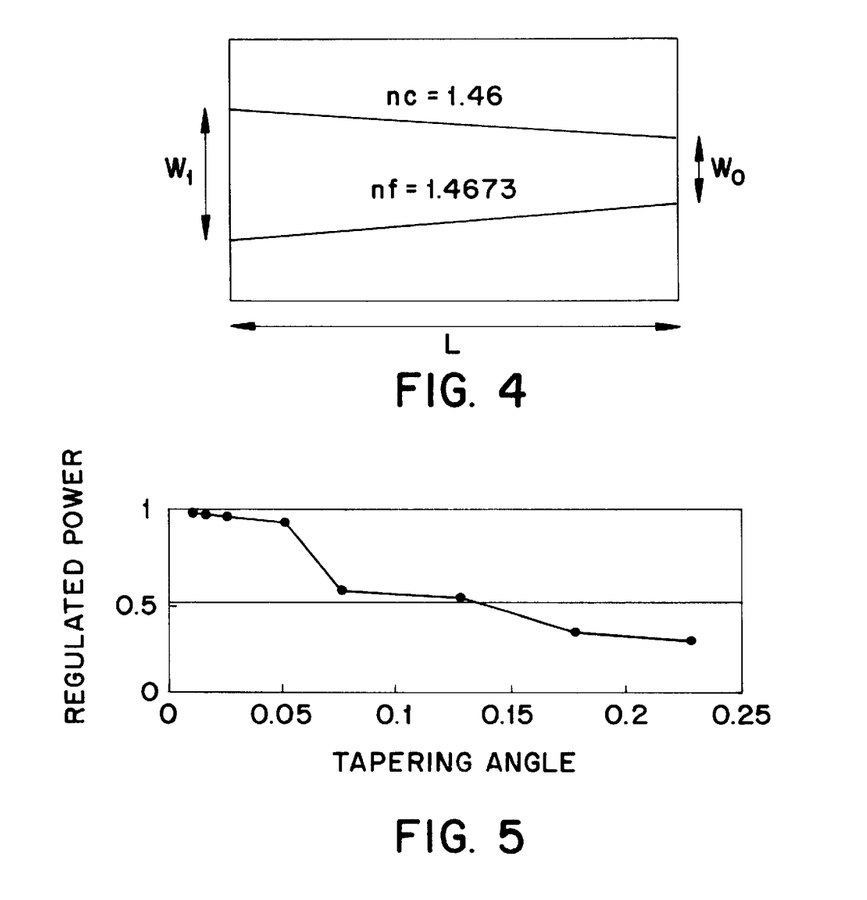
FIG. 4 is a transverse cross-sectional view of a tapered waveguide channel device.
FIG. 5 shows the relationship between the tapering angle and the exit light power in a tapered waveguide channel device.

FIG. 5 shows the relationship between the tapering angle and the regulated power of the exit light when basic mode light having a 0.78 μm wavelength enters the tapered waveguide channel device shown in FIG. 4. Here, the thickness of the core is 5 μm, the refractive index of the core 'nf' is 1.4673, and the refractive index of the clad 'nc' is 1.46. If the width of the core at the entry edge is $W_i$, the width at the exit edge is $W_0$, and the length of the core is L, the tapering angle is defined by the following equation.

$$\text{Angle}=(W_i-W_0)/2L$$

It is seen from FIG. 5 that the tapering angle is preferably 0.05 degrees or less. It is necessary, when actually creating the tapering, to make the tapering angle sufficiently gradual.

Figure 6:
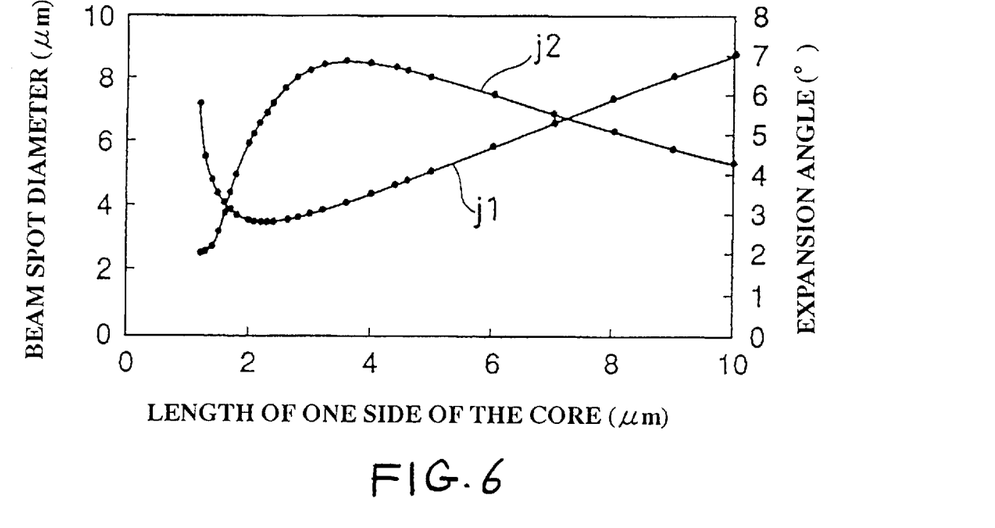
FIG. 6 shows the manner in which the beam spot diameter and expansion angle of the exit light change depending on the area of the core at the exit edge in the optical waveguide channel device.

FIG. 6 shows how the beam spot diameter and the expansion angle of the exit light changes depending on the vertical cross-sectional area of the core at the exit edge 1b. In the optical waveguide channel device used here, the vertical cross-section is square in configuration and the specific refraction Δn between the refractive index $n_0$ of the clad and the refractive index of the core $n_1$ is 0.5%. $\Delta n=(n_1-n_0)/n_1 \times 100\%$. The wavelength of the laser beam that is caused to enter the optical waveguide channel device is 780 nm. The horizontal axis represents the length of one side of the core and the vertical axis represents the beam spot diameter (the left vertical axis) and the expansion angle of the exit light (the right vertical axis). The curved line j1 represents the change in the beam spot diameter of the exit light, and the curved line j2 represents the change in the expansion angle of the exit light.

It is seen from FIG. 6 that the beam spot diameter becomes the smallest when the length of one side of the core is approximately 2 μm, and a larger beam spot diameter may be obtained when the length of one side of the core is longer or shorter than that. In other words, two values exist as the length of one side of the core with which the needed beam spot diameter may be obtained other than the smallest value. Which value to take should be determined depending on the needed expansion angle and design considerations. It is seen from FIG. 6 that the expansion angle is the largest when the length of one side of the core is approximately 3.5 μm, and the expansion angle is smaller when the length of one side of the core is longer or smaller than that. In this embodiment, the configuration and area of the core at the exit opening are determined in accordance with the needed beam spot diameter and expansion angle.

Figure 7:
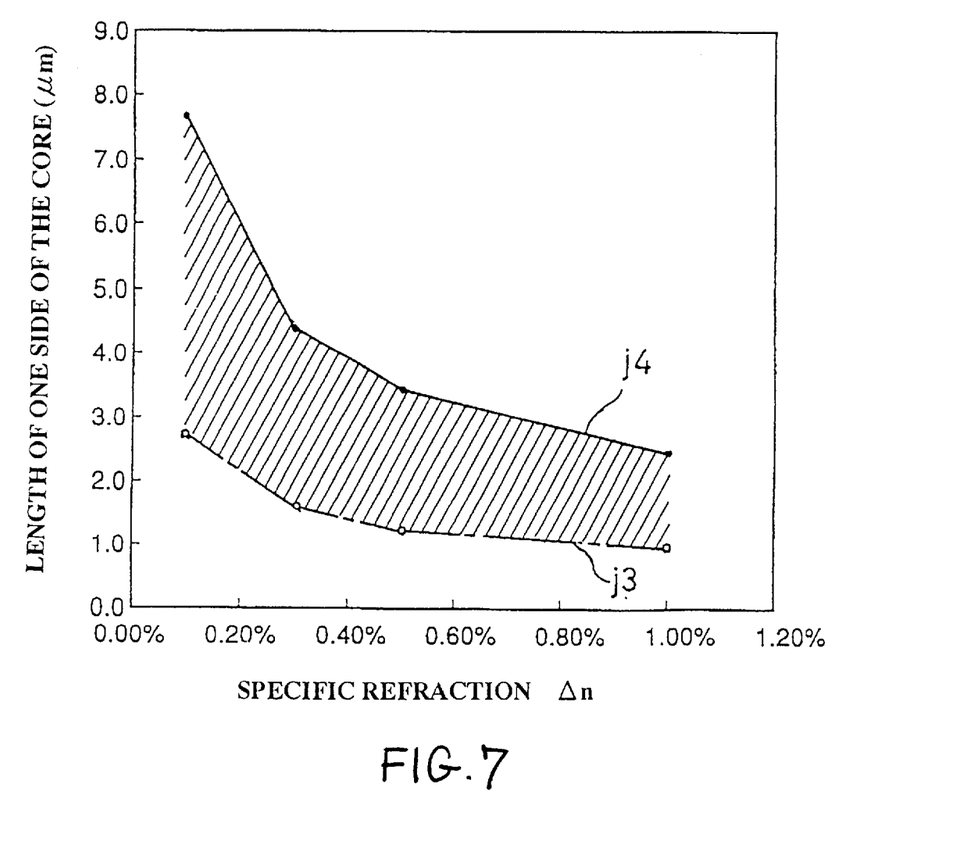
FIG. 7 shows the manner in which the waveguide mode changes depending on the core conditions.

In the core 11, 12 or 13 of the optical waveguide channel device 1 of this embodiment, the waveguide mode in areas other than the entry area 11a, 12a or 13a and the exit area 11c, 12c or 13c is a single mode. The area of the vertical cross-section of the core having a single mode changes depending on the specific refraction Δn. FIG. 7 shows the specific refraction Δn and the length of one side of a square core in response to the waveguide mode. The horizontal axis represents the specific refraction Δn, and the vertical axis represents the length of one side of the core. The curved line j3 represents the conditions in which the basic mode appears, and the curved line j4 represents the conditions in which the high-order mode appears. In other words, if the core is made using the conditions of the shaded area in which the basic mode appears but the high-order mode does not appear, a waveguide channel device having a single mode may be obtained. Where the vertical cross-section of the core is rectangular, a different condition applies regarding the length of the sides that offer a single mode, but the curved area of the core should be made such that the conditions for a single mode are met as well.

In the core 11 or 13 of the optical waveguide channel device 1, a straight area having a straight optical axis and a consistent vertical cross-sectional configuration and area exists immediately before and after the curved area 11b or 13b (indicated as 11d, 11e, 13d and 13e in FIGS. 2 and 3). When light travels in the curved area 11b or 13b, the profile becomes asymmetrical, but this asymmetry may be reduced or the effect of the asymmetry may be reduced by means of the straight areas 11d and 11e or 13d and 13e. By having a straight area 11e or 13e that does not receive force exhibiting this asymmetry located immediately after the curved area 11b or 13b, the asymmetrical force received in the curved area 11b or 13b may be reduced. In addition, by having a straight area 11d or 13d located immediately before the curved area 11b or 13b, traveling light that is not receiving asymmetrical force enters the curved area 11b or 13b. As a result, high-order light is not easily excited in the curved areas 11b or 13b. It is preferred that the length of the straight area 11d, 11e, 13d or 13e be at least ten times the wavelength of the beam that enters the core.

Figure 8:
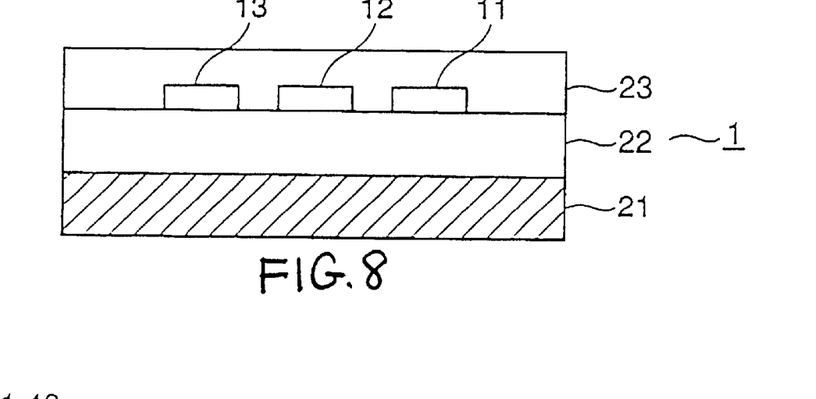
FIG. 8 shows a detailed construction of the optical waveguide channel device seen from the exit edge.

A specific example of the optical waveguide channel device 1 shown in FIG. 2 is shown below. FIG. 8 shows in a simplified fashion the specific construction of the optical waveguide channel device 1 shown in FIG. 2, seen from the exit edge. As shown in this drawing, a lower clad layer 22 and an upper clad layer 23 are formed in that order from the bottom on top of a substrate 21 formed of glass or Si, and cores 11, 12 and 13, which comprise the light paths for the laser beams, are located on the upper clad layer 23 As the material for these layers, quartz, polyimide resin or epoxy resin is used. The clad layers 22 and 23 are used to prevent the light from escaping from the core 11, 12 or 13, and are formed such that they have a lower refractive index than the core 11, 12 or 13.

The method to create an optical waveguide channel device by using TEOS (tetra ethyl ortho silicate: Si $(OC_2H_5)_4$) as the material for the layers to form $SiO_2$ or doped $SiO_2$ film by means of the low-temperature plasma CVD method will be explained. It is well known that the refractive index may be changed by doping $SiO_2$. For example, by doping $SiO_2$ with Ge to create $SiO_2$:Ge, the refractive index can be increased, and by doping $SiO_2$ with F to create $SiO_2$:F, the refractive index can be decreased. Therefore, the optical waveguide channel device could have a construction (lower clad layer/cores/upper clad layer) of ($SiO_2/SiO_2$:Ge/$SiO_2$) or ($SiO_2$:F/$SiO_2$/$SiO_2$:F), for example.

Figure 9:
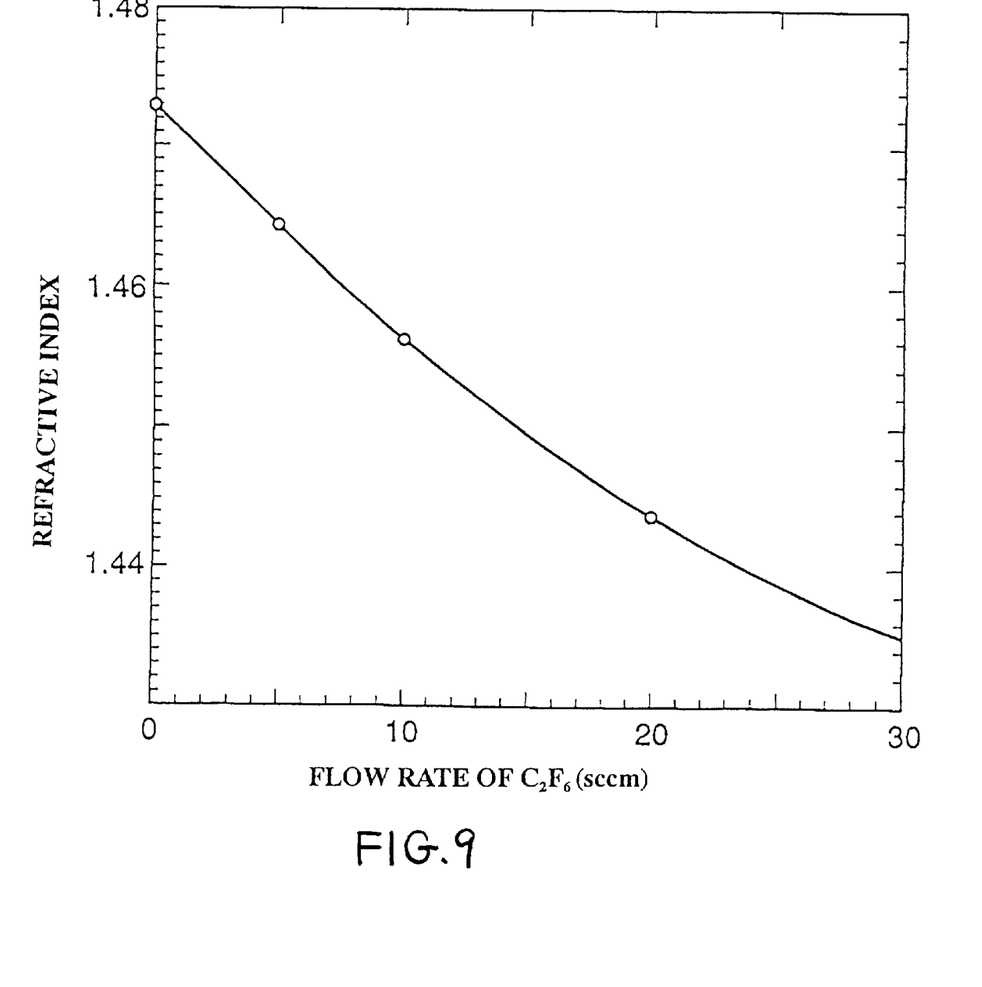
FIG. 9 shows the manner in which the refractive index of $SiO_2$ changes relative to the doping amount of F.

FIG. 9 shows the manner in which the refractive index changes depending on the flow rate of $C_2F_6$ during film formation based on the conditions shown in Table 1. The doping amount of F is proportional to the $C_2F_6$ flow rate. It is seen from FIG. 9 that the higher the doping amount of F, the smaller the refractive index.

TABLE 1

| RF power | 300 W |
| --- | --- |
| Film formation temperature | 350° C. |
| TEOS | 12 sccm |
| $O_2$ | 100 sccm |
| Gas pressure | 0.6 Torr |

Figures 10A, 10G:
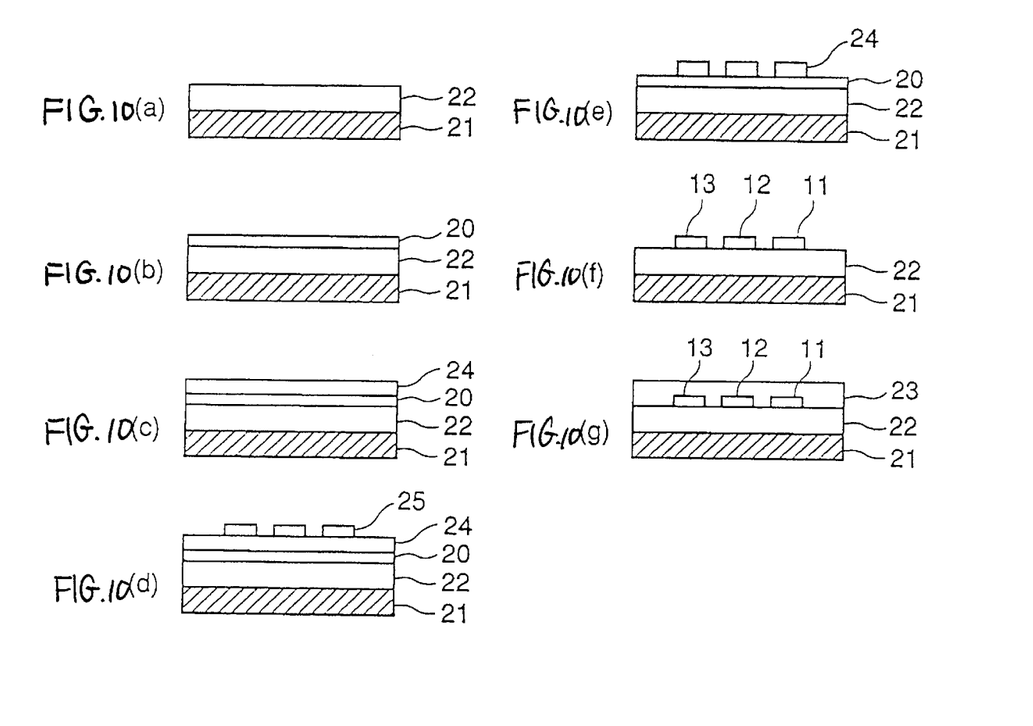

Using an optical waveguide channel device having the construction of ($SiO_2$:F/$SiO_2$/$SiO_2$:F) as an example, an example of specific manufacturing process will be explained. FIG. 10 shows in a simplified fashion the specific manufacturing process of the optical waveguide channel device 1. First, as shown in FIG. 10(a), F-doped $SiO_2$ film 22 is formed on top of the substrate 21 as the lower clad layer using the conditions shown in Table 2, such that it is approximately 15 μm. For the substrate 21, a quartz substrate that has an essentially equal thermal expansion characteristic to the film is used so that cracks will not be caused in the optical waveguide channel device 2 due to thermal stress.

TABLE 2

| RF power | 700 W |
| --- | --- |
| Film formation temperature | 400° C. |
| TEOS | 20 sccm |
| $O_2$ | 680 sccm |
| $C_2F_6$ | 37 sccm |
| Gas pressure | 0.4 Torr |

Non-doped $SiO_2$ film 20 is then formed as the core layer to be approximately 5 μm, using the conditions shown in Table 3, on top of the lower clad layer, as shown in FIG. 10(b).

TABLE 3

| RF power | 700 W |
| --- | --- |
| Film formation temperature | 400° C. |
| TEOS | 20 sccm |

TABLE 3-continued

| $O_2$ | 680 sccm |
| --- | --- |
| Gas pressure | 0.4 Torr |

An amorphous silicon layer 24 having a thickness of 0.6 μm is then formed by means of the sputtering method as a masking material on top of the core layer 20, as shown in FIG. 10(c). A resist 25 having a thickness of 0.2 μm is then formed on top of the amorphous silicon film 24, and patterning is performed by means of photolithography to create the core shapes shown in FIG. 10(d). As shown in FIG. 10(e), the amorphous silicone film 24 is then patterned by means of reactive etching.

When the core layer 20 is patterned by means of dry etching when the state of FIG. 10(e) is present, the remaining parts become the cores 11, 12 and 13, as shown in FIG. 10(f). An upper clad layer 23 is then formed on top of the lower clad layer 22 so that it will cover the cores 11, 12 and 13, as shown in FIG. 10(g). For the upper clad layer 23, F-doped $SiO_2$ film is formed to be 15 μm thick using the film forming conditions shown in Table 1 in the same way as the lower clad layer 22. Through this process, the optical waveguide channel device 1 of this embodiment is created.

The thickness of each core 11, 12 or 13 created through patterning in the optical waveguide channel device 1 in the vertical-cross section is a consistent 5 μm. The transverse cross-sectional width at the entry edge 1a is 40 μm. The width in areas other than the entry area 11a, 12a or 13a is 3 μm. The length of each straight area 11d, 11e, 13d or 13e is 3 cm. The radius of curvature of the curved area 11b or 13b is 25 μm (the curved area 11b and 13b is a combination of two circular arcs, and the radius of curvature for either circular arc was 25 μm). The specific refraction Δn was 0.3%.

Figure 11:
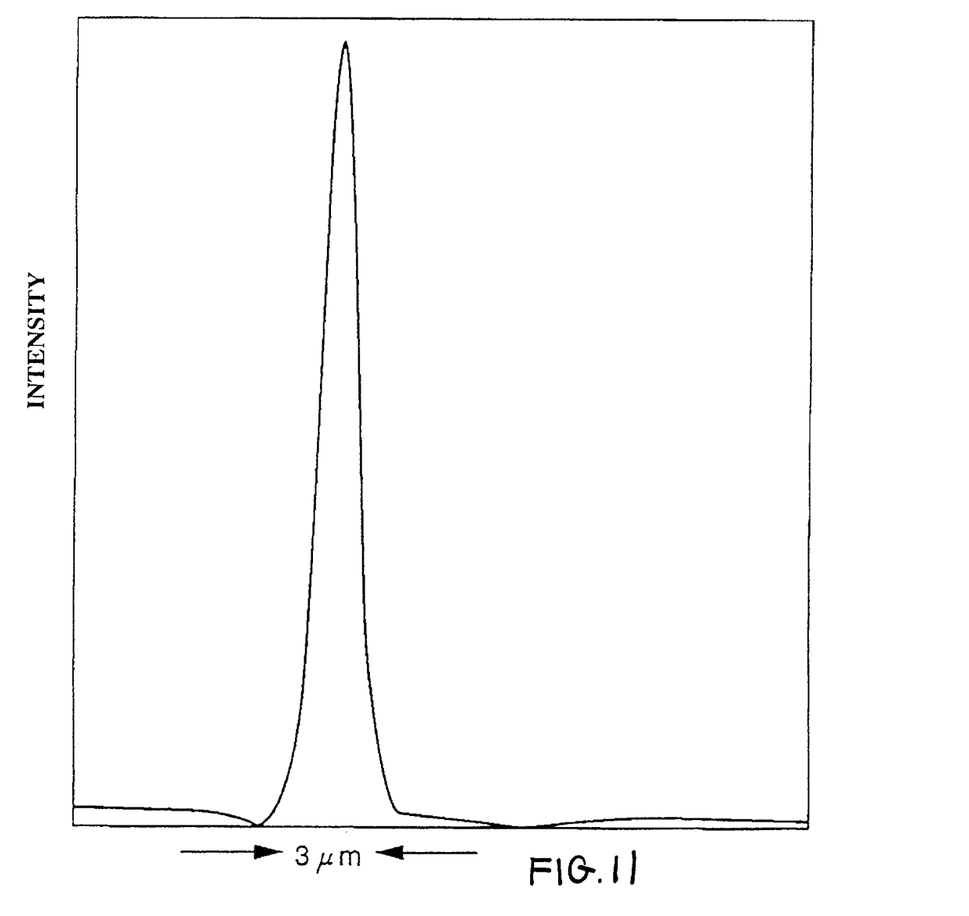
FIG. 11 shows the profile of the transverse cross-section of the exit light obtained in this embodiment.

FIG. 11 shows the transverse cross-sectional profile of the exit light that is obtained from one of the cores when basic mode laser beams having a 780 nm wavelength are caused to enter the optical waveguide channel device 1 of this embodiment. As shown in FIG. 11, basic mode exit light having a 3 μm beam spot diameter in the transverse cross-section, i.e., exit light having an essentially Gaussian configuration, may be obtained.

Figure 12:
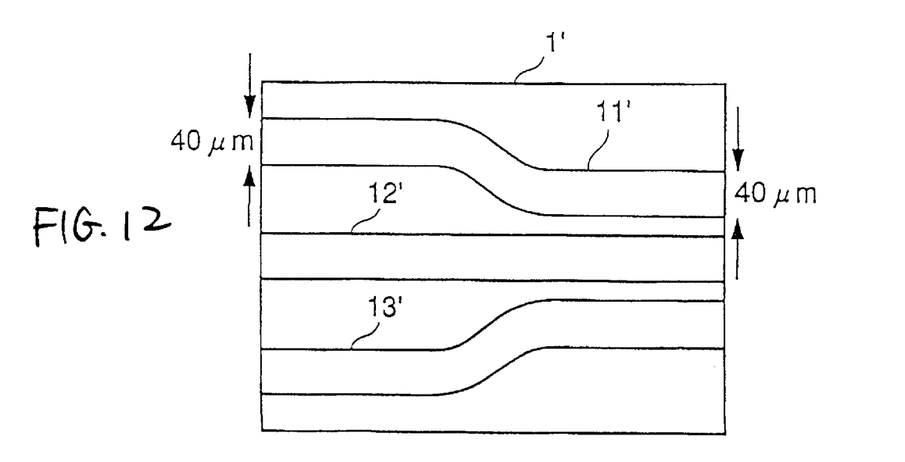
FIG. 12 is a transverse cross-sectional view of the optical waveguide channel device of a comparison example 1.

As a comparison example, the profile of the exit light that is obtained from an optical waveguide channel device having cores of a different configuration than those in this embodiment will be explained. FIG. 12 shows the transverse cross-sectional view of an optical waveguide channel device 1' of a comparison example 1. The configuration and size of the vertical cross-section of each core 11', 12' or 13' of the optical waveguide channel device 1' of the comparison example 1 is consistent from the entry edge to the exit edge, and the configuration and the size of each core in the vertical cross-section are the same as those of the core 11, 12 or 13 of the optical waveguide channel device 1 of this embodiment. In other words, the width of each core in the transverse cross-section is a consistent 40 μm. It otherwise has the same construction as the optical waveguide channel device 1.

Figure 13:
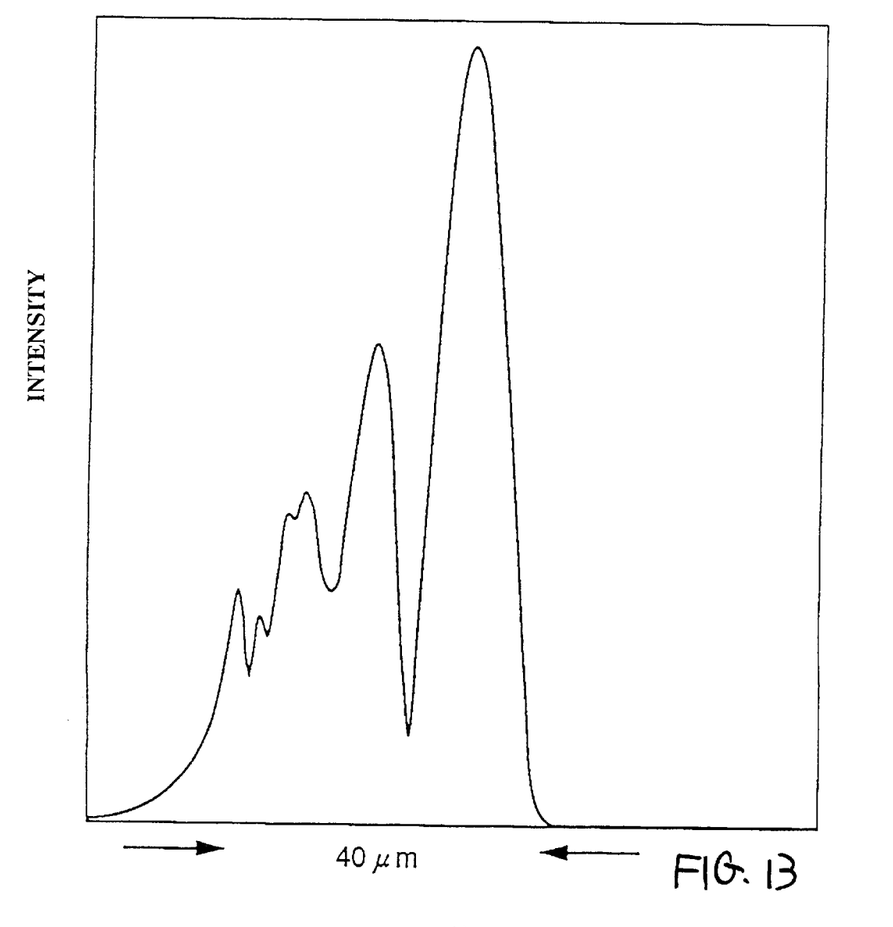
FIG. 13 shows the profile of the transverse cross-section of the exit light obtained in the comparison example 1.

FIG. 13 shows the transverse cross-sectional profile of the exit light that is obtained from one of the cores when basic mode laser beams having a 780 nm wavelength are caused to enter the optical waveguide channel device 1' of the comparison example 1. As shown in FIG. 13, high-order light is induced in the exit light and its beam spot diameter is substantially larger, at 40 μm. This is because high-order light is excited in the multi-mode curved area. If exit light having such a profile is caused to enter the optical system located after the optical waveguide channel device, the potential of the optical system is not fully utilized, which is not desirable.

Figure 14:
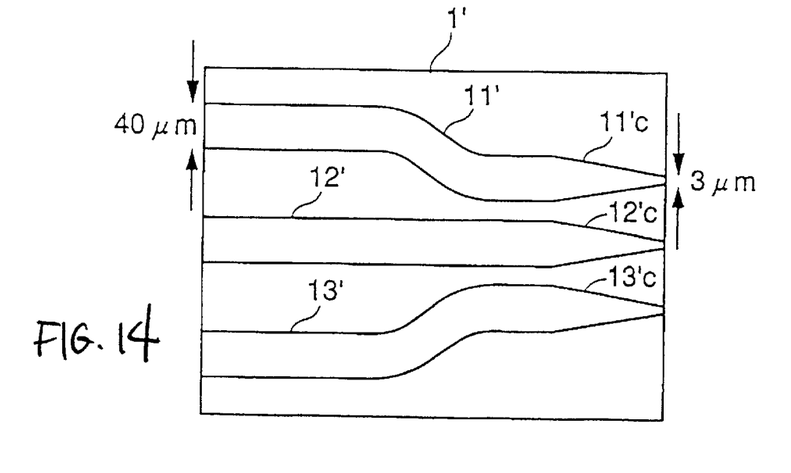
FIG. 14 is a transverse cross-sectional view of the optical waveguide channel device of a comparison example 2.

FIG. 14 shows the transverse cross-section of an optical waveguide channel device 1' of a comparison example 2. The comparison example 2 differs from the comparison example 1 only in that it has exit areas 11'c, 12'c and 13'c, which are tapered in the transverse cross-section such that they become smaller toward the exit edge from a certain point that is about 3 cm after the curved areas. The width of the exit area 11'c, 12'c or 13'c is 3 μm at the exit edge in the transverse cross-section. When basic mode laser beams having a 780 nm wavelength are caused to enter this optical waveguide channel device 1', the transverse cross-sectional profile of the exit light obtained from one of the cores has an essentially Gaussian configuration, like the one shown in FIG. 11. However, its strength is approximately two-thirds of the one obtained in this embodiment. This is because high-order mode traveling light is excited in the curved area and is radiated in the exit area 11'c, 12'c or 13'c, resulting in some loss. Such a large loss is undesirable from a practical standpoint.

An embodiment of the optical waveguide channel device that may be applied as a multi-beam light source having three secondary light sources has been explained above, but the present invention is not limited to three secondary light sources. It may be applied for any multi-beam light source comprising multiple secondary light sources. In addition, not only laser light but any light source that emits coherent light may be used as the light source for this device because such light travels through a waveguide channel device.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical waveguide channel device, comprising:
   a substrate; and
   multiple cores located on the substrate to guide coherent beams, the distances between the axes of adjacent cores being smaller at an exit edge of each core than at an entry edge, wherein
      a single waveguide mode is present in a specific area located between the entry edge of at least one of said multiple cores and the exit edge, and the area of the cross-section perpendicular to the one axis of the at least core is larger at the entry edge than at the specific area.

2. An optical waveguide channel device according to claim 1, wherein the specific area includes a curved area in which the axis of the at least one core is curved.

3. An optical waveguide channel device according to claim 2, wherein the area of the cross-section perpendicular to the axis of said at least one core is different at the exit edge and within the curved area.

4. An optical waveguide channel device according to claim 2, wherein said at least one core has a prescribed area having a straight axis and a consistent configuration in an area in the cross-section perpendicular to the axis immediately before the curved area.

5. An optical waveguide channel device according to claim 2, wherein the at least one core has a prescribed area having a straight axis and a consistent configuration in an area in the cross-section perpendicular to the axis immediately after the curved area.

6. An optical waveguide channel device, comprising:
   a substrate; and
   a core that is located on the substrate, said core including a curved area in which an axis of the core is curved and a straight area in which an axis of the straight area is straight, and guides coherent beams, wherein the curved area has a single waveguide mode and wherein the straight area has a perpendicular cross-sectional area large enough to have more than a single mode.

7. An optical waveguide channel device according to claim 6, wherein an area of the cross-section perpendicular to the axis of said core is different at the exit edge and within the curved area.

8. An optical waveguide channel device according to claim 6, wherein an area of the cross-section perpendicular to the axis of said core is larger at the entry edge than at the curved area.

9. An optical waveguide channel device according to claim 6, wherein the core has a prescribed area having a straight axis and a consistent configuration in an area in the cross-section perpendicular to the axis immediately before the curved area.

10. An optical waveguide channel device according to claim 6, wherein the core has a prescribed area having a straight axis and a consistent configuration in an area in the cross-section perpendicular to the axis immediately after the curved area.

11. An optical waveguide channel device, comprising:
    a substrate;
    multiple cores located on said substrate, each of said multiple cores for guiding a coherent light beam, wherein each of said cores has an entry end wherein coherent light enters each respective core and an exit end;
    wherein coherent light beams exists in said respective cores, said entrance ends being located at an entry edge of said substrate and said exit ends being located at an exit edge of said substrate;
    wherein the distances between axes of adjacent cores of said multiple cores are smaller at the exit edge than at the entry edge of said substrate, and wherein a single waveguide mode is present in a specific area of at least one of said multiple cores located between said entry end of said at least one core and said exit end of said at least one core;
    wherein an area of cross-section perpendicular to an axis of said at least one of said multiple cores is larger at the entry end than at said specific areas, and wherein said reduction in cross-sectional area has a tapering angle of 0.05° or less; and
    wherein said exit end of said at least one of said multiple cores is different than the cross-sectional area of said at least one core at said specified area.

12. A method of designing an optical waveguide channel device, comprising the steps of:
    providing a substrate;
    providing multiple cores to guide coherent light beams located on the substrate wherein distances between the axes of adjacent cores are smaller at a first edge of said substrate than at a second edge of said substrate, wherein said step of providing multiple cores includes for at least one core the steps of:
    providing a first section of said at least one core;
    providing a second curved section of said at least one core;

providing a third section of said at least one core; and
wherein said second, curved section is configured such that a single waveguide mode is present, and wherein at least one of said first section and said third section has a cross-section area larger than said second section.

13. The method of claim 11 further comprising the step of providing a straight section in said first section preceding said second, curved section.

14. The method of claim 11 further comprising the step of providing a straight portion in said third section immediately after said second, curved section.

15. The method of claim 12 further comprising the step of providing a tapered portion in said first section.

16. The method of claim 12 wherein each of said cores is tapered from the first side of the substrate to the second side of the substrate to the tapering angle of 0.05° or less.

17. An optical waveguide channel device according to claim 1, wherein said specific area in which a single waveguide mode is present includes a curved area in which the axes of at least one core is curved, and said at least one of multiple cores further includes a straight area in which the axis of the straight area is straight wherein the straight area has a perpendicular cross-sectional area large enough to have more than a single mode.

* * * * *